United States Patent
Nakajima et al.

(10) Patent No.: US 10,180,347 B2
(45) Date of Patent: Jan. 15, 2019

(54) ACOUSTIC WAVE ACQUIRING APPARATUS AND CONTROL METHOD THEREFOR

(71) Applicant: CANON KABUSHIKI KAISHA, Tokyo (JP)

(72) Inventors: Takao Nakajima, Kawasaki (JP); Takeshi Uchida, Hiratsuka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 395 days.

(21) Appl. No.: 14/765,080

(22) PCT Filed: Feb. 18, 2014

(86) PCT No.: PCT/JP2014/054249
§ 371 (c)(1),
(2) Date: Jul. 31, 2015

(87) PCT Pub. No.: WO2014/129611
PCT Pub. Date: Aug. 28, 2014

(65) Prior Publication Data
US 2015/0369651 A1 Dec. 24, 2015

(30) Foreign Application Priority Data
Feb. 25, 2013 (JP) .................................. 2013-034469

(51) Int. Cl.
*G01H 9/00* (2006.01)
(52) U.S. Cl.
CPC ............... *G01H 9/00* (2013.01); *G01H 9/002* (2013.01)
(58) Field of Classification Search
CPC .................................. G01H 9/00; G01H 9/002
(Continued)

(56) References Cited

U.S. PATENT DOCUMENTS

| 5,392,117 A * | 2/1995 | Belleville ............... G01D 5/266 250/227.27 |
| 5,532,981 A | 7/1996 | Duggal et al. ................. 367/149 |
| 5,585,921 A * | 12/1996 | Pepper ................. G01N 29/075 356/432 |

(Continued)

FOREIGN PATENT DOCUMENTS

| JP | H05-323197 | 12/1993 |
| JP | 2003-102734 | 4/2003 |

(Continued)

OTHER PUBLICATIONS

E. Zhang et al., "Backward-Mode Multiwavelength Photoacoustic Scanner Using a Planar Fabry-Perot Polymer Film Ultrasound Sensor for High-Resolution Three-Dimensional Imaging of Biological Tissues", *Applied Optics*, vol. 47, No. 4, pp. 561-577 (Feb. 1, 2008).

(Continued)

*Primary Examiner* — J M Saint Surin
(74) *Attorney, Agent, or Firm* — Venable LLP

(57) ABSTRACT

An acoustic wave acquiring apparatus is used that includes: an array light source including a plurality of elements emitting measurement light; a controller controlling the wavelength of the measurement light, for each of or the plurality of elements; a Fabry-Perot interferometer including a first mirror upon which the measurement light is incident and a second mirror upon which an acoustic wave from a subject is incident; an optical sensor measuring a light quantity of reflected light by the first and the second mirror; and a processor acquiring an intensity of the acoustic wave on the basis of a change of the light quantity of the reflected light, which is a distance between the first mirror and the second mirror, occurring due to the incidence of the acoustic wave.

18 Claims, 10 Drawing Sheets

(58) Field of Classification Search
USPC .......................................................... 73/655
See application file for complete search history.

(56) References Cited

U.S. PATENT DOCUMENTS

| | | | | |
|---|---|---|---|---|
| 5,706,079 | A * | 1/1998 | Kersey | G01D 5/35316 356/482 |
| 5,892,582 | A * | 4/1999 | Bao | G01D 5/35383 250/227.27 |
| 9,116,111 | B2 | 8/2015 | Nakajima et al. | G01N 29/2418 |
| 9,366,564 | B2 * | 6/2016 | Asao | G01H 9/00 |
| 2004/0147810 | A1 | 7/2004 | Mizuno | 600/178 |
| 2009/0135872 | A1 | 5/2009 | Uchida et al. | 372/44.01 |
| 2010/0191109 | A1 | 7/2010 | Fukutani et al. | 600/437 |
| 2013/0160557 | A1 | 6/2013 | Nakajima et al. | G01H 9/00 |
| 2014/0066743 | A1 | 3/2014 | Nakajima et al. | A61B 5/0095 |
| 2014/0076055 | A1 | 3/2014 | Asao et al. | G01H 9/00 |

FOREIGN PATENT DOCUMENTS

| | | |
|---|---|---|
| JP | 2004-222870 | 8/2004 |
| WO | WO 2013/012019 A | 1/2013 |

OTHER PUBLICATIONS

M. Lamont et al., "2D Imaging of Ultrasound Fields Using CCD Array to Map Output of Fabry-Perot Polymer Film Sensor", *Electronics Letters*, vol. 42, No. 3, pp. 187-189 (Feb. 2, 2006).

T. Sato et al., "Oscillation Wavelength Shift of a Semiconductor Laser in a Magnetic Field and Examination of Its Shift Mechanism", *T. IEE Japan*, vol. 114-C, No. 10, pp. 1031-1038 (1994), with English abstract.

N. Nunoya et al., "Development of Fast Wavelength Tunable Distributed Amplification DFB Laser", *NTT Technical Journal*, vol. 24, No. 10, pp. 48-52 (Oct. 2012) (in Japanese).

* cited by examiner

ACOUSTIC WAVE ACQUIRING APPARATUS AND CONTROL METHOD THEREFOR

TECHNICAL FIELD

The present invention relates to an acoustic wave acquiring apparatus and a control method therefor.

BACKGROUND ART

Imaging devices using X-rays, ultrasound waves and MRI (nuclear magnetic resonance method) are generally used in the medical field. The research of photoimaging devices has also been advanced in the medical field. Photoimaging devices use photoimaging technique for obtaining information on the interior of a subject by detecting light propagating inside the subject. Photoacoustic imaging technique is one of such photoimaging techniques.

Photoacoustic imaging is a technique for visualizing information relating to optical property values of the subject interior by detecting an acoustic wave (can be also referred to as photoacoustic wave), which is generated inside the subject irradiated with light, in a plurality of locations and analyzing the obtained signals. As a result, it is possible to obtain an optical property value distribution, in particular an optical energy absorption density distribution, inside the subject. A transducer using a piezoelectric effect and a transducer using capacity variations have been used as acoustic wave detectors in photoacoustic imaging. A detector using optical resonance has recently been developed (Non-Patent Literature 1).

A structure in which light is resonated between two parallel reflective plates is called a Fabry-Perot interferometer. An acoustic wave detector using the Fabry-Perot interferometer is called a Fabry-Perot probe. The Fabry-Perot probe has a structure in which a polymer film is sandwiched between two mirrors, and where an elastic wave is incident thereupon, the inter-mirror distance (referred to hereinbelow as "cavity length") changes. The elastic wave can be detected by detecting variations in reflectance occurring in this case. In order to detect the reflectance, the Fabry-Perot probe is irradiated with a measurement light. The area where this irradiation is implemented becomes a reception region (corresponds to one element size in the piezoelectric probe) in which the acoustic wave can be detected. Since the Fabry-Perot probe has a broad band and can inhibit the decrease in sensitivity when the reception region is reduced, high-resolution imaging can be performed.

However, in practical use of imaging devices, it is important to perform imaging in a short time. In particular, when the examination object is a living body, as in the medical field, it is necessary to perform the imaging in a short time and reduce strain on the subject. In order to perform the imaging in a short time, it is necessary to perform data acquisition in a short time. However, in the use of a single-element probe, when the measurement object region is wide, the subject should be scanned two dimensionally. This lengthens the data acquisition time.

To address this problem there is an example in which, in a Fabry-Perot interferometer a CCD camera is used as a two-dimensional array sensor in order to acquire the two-dimensional distribution of an elastic wave and shorten the measurement time (Non-Patent Literature 2) in a batch mode.

A semiconductor laser called a vertical-cavity surface-emitting laser (VCSEL) is explained below. In the usual end-emission semiconductor laser, light is emitted from the end surface of the substrate thereof, whereas in the VCSEL, light is emitted in the direction perpendicular to the substrate (Patent Literature 1). Further, in the VCSEL, the reduction in volume of the active layer is achieved due to the improvement in its structure and processing process, hence the laser like this features operation a low threshold and low power consumption. Other advantages thereof include a small time constant of internal temperature increase and a fast response. In some cases, a plurality of such semiconductor lasers are arranged two dimensionally above a substrate.

CITATION LIST

Patent Literature

PTL 1: US Patent Application Publication No. 2009/0135872

Non-Patent Literature

NPL 1: E. Zang, J. Laufer, and P. Beard, "Backward-mode multiwavelength photoacoustic scanner using a planar Fabry-Perot polymer film ultrasound sensor for high-resolution three-dimensional imaging of biological tissue", Applied Optics, 47, 4 (2008)

NPL 2: M. Lamont, P. Beard, "2D imaging of ultrasound fields using CCD array to map output of Fabry-Perot polymer film sensor", Electronics Letters, 42, 3 (2006)

SUMMARY OF INVENTION

Technical Problem

In the production of a Fabry-Perot probe, variation sometimes occurs in film thickness when the polymer film positioned between two mirrors is grown. As a result, variation appears in the inter-mirror distance (cavity length). Since the resonance wavelength of the measurement light differs according to the cavity length, where single-wavelength measurement light is used with respect to the Fabry-Perot probe that has variation in cavity length, the detection sensitivity changes depending on the position on a mirror. Therefore, when there is variation in cavity length, the measurement light wavelength should be set to an adequate value for each irradiation position in order to maintain a constant detection sensitivity of acoustic waves.

In Non-Patent Literature 2, the entire Fabry-Perot probe is irradiated with a DBR laser of a certain single wavelength. Therefore, when there is variation in cavity length, the sensitivity to the acoustic wave differs depending on the position on the probe, as indicated hereinabove. Thus, a position with degraded sensitivity with respect to acoustic waves, or a location without any sensitivity appears and an accurate sound pressure distribution cannot be measured.

The present invention has been created to resolve this problem, and it is an object thereof to provide a technique for correcting variation in resonance wavelength over the element surface in a Fabry-Perot probe and accurately measuring the entire sound pressure distribution in a batch mode.

Solution to Problem

The present invention provides an acoustic wave acquiring apparatus comprising:
an array light source including a plurality of elements configured to emit measurement light;

a controller configured to control a wavelength of the measurement light, which is emitted from the array light source, for each of or the plurality of elements;

a Fabry-Perot interferometer including a first mirror upon which the measurement light is incident and a second mirror upon which an acoustic wave from a subject is incident;

an optical sensor configured to measure a light quantity of reflected light produced by reflection of the measurement light by the first and the second mirror; and a processor configured to acquire an intensity of the acoustic wave on the basis of a change of the light quantity of the reflected light that is caused by a change of a cavity length, which is a distance between the first mirror and the second mirror, occurring due to the incidence of the acoustic wave on the second mirror.

The present invention also provides a control method for an acoustic wave acquiring apparatus including:

an array light source including a plurality of elements configured to emit measurement light;

a controller configured to control a wavelength of the measurement light, which is emitted from the array light source, for each of or the plurality of elements;

a Fabry-Perot interferometer including a first mirror upon which the measurement light is incident and a second mirror upon which an acoustic wave from a subject is incident;

an optical sensor configured to measure a light quantity of reflected light produced by reflection of the measurement light by the first and the second mirror; and a processor configured to acquire an intensity of the acoustic wave on the basis of a change of the light quantity of the reflected light that is caused by a change of a cavity length, which is a distance between the first mirror and the second mirror, occurring due to the incidence of the acoustic wave on the second mirror, the control method comprising:

a step of operating the array light source to emit the measurement light under control by the control unit;

a step of operating the optical sensor to measure the reflected light from the Fabry-Perot interferometer; and a step of operating the processor to acquire the intensity of the acoustic wave.

Advantageous Effects of Invention

According to the present invention, it is possible to provide a technique for correcting variation in resonance wavelength over the element surface and accurately measuring the entire sound pressure distribution comprehensively in a Fabry-Perot probe.

Further features of the present invention will become apparent from the following description of exemplary embodiments with reference to the attached drawings.

DESCRIPTION OF EMBODIMENTS

Figure 1:
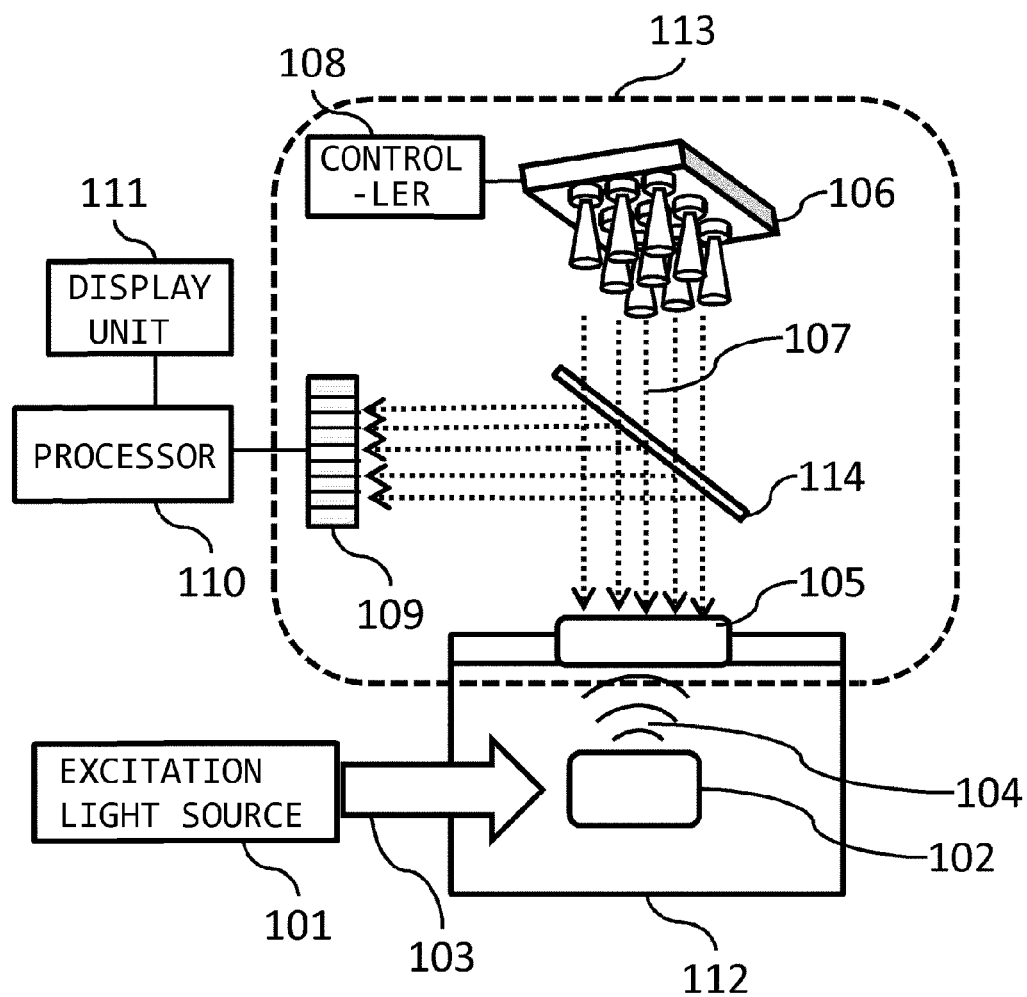
FIG. 1 shows an example of the configuration of the subject information acquiring apparatus according to Embodiment 1.

The preferred embodiments of the present invention are explained below with reference to the appended drawings. The size, materials, shapes, and mutual arranged of constituent components described hereinbelow should be changed, as appropriate, according to the configuration or conditions of the apparatus using the present invention, and the scope of the invention should not be construed as being limited to the description below.

The subject information acquiring apparatus in accordance with the present invention is inclusive of an apparatus using an ultrasound echo technique for transmitting an acoustic wave such as ultrasound wave to a subject, receiving a reflected wave (echo wave) that has been reflected and propagated inside the subject, and acquiring the subject information as image data, and is also inclusive of an apparatus that uses a photoacoustic effect for receiving an acoustic wave that has been generated in the subjected by irradiation of the subject with light (electromagnetic wave) and has propagated inside the subject, and acquiring the subject information as image data. The subject information acquiring apparatus can be also understood as an imaging device for imaging the subject interior.

In the case of the former apparatus that uses the ultrasound echo technique, the acquired subject information reflects the difference in acoustic impedance between the tissues inside the subject. In the case of the latter apparatus that uses the photoacoustic effect, the acquired subject information shows the generation source distribution of acoustic waves generated by light irradiation, the initial sound pressure distribution inside the subject or the light energy absorption density distribution or absorption coefficient distribution derived from the initial sound pressure distribution, and the density distribution of the substance constituting a tissue. The density distribution of the substance constituting a tissue, is, for example, an oxygen saturation degree distribution or oxyhemoglobin/deoxyhemoglobin distribution of a blood component, a fat, collagen, or water.

An acoustic wave, as referred to in the present invention, is typically an ultrasound wave and includes elastic waves called sound waves and acoustic waves. The acoustic wave generated by the photoacoustic effect is called a photoacoustic wave or a photoultrasound wave. The apparatus in accordance with the present invention receives an acoustic wave that has been generated or reflected and propagated inside a substrate by an acoustic wave detector such as a probe. Part of the subject information acquiring apparatus in accordance with the present invention that detects such acoustic waves is sometimes referred to as an acoustic wave acquiring apparatus.

[Embodiment 1]

Embodiment 1 of the present invention is explained below. In the description below, the measurement light is a concept inclusive of incident light that is incident upon a Fabry-Perot interferometer and a reflected light that is reflected by the Fabry-Perot interferometer and guided to an array-type optical sensor. The measurement light should be distinguished from excitation light that is used to irradiate the subject in order to generate an acoustic wave based on the photoacoustic effect.

FIG. 1 shows an example of apparatus configuration in the present embodiment.

The subject information acquiring apparatus includes an excitation light source 101. The excitation light source 101 irradiates a subject 102 with excitation light 103. As a result, a light-absorbing body inside the subject or on the surface thereof absorbs part of the light energy, and a photoacoustic wave 104 is generated. Examples of the light-absorbing body inside the subject include tumors and blood vessels.

An acoustic wave acquiring apparatus 113 according to the present embodiment is provided with a Fabry-Perot probe 105 for detecting the photoacoustic wave 104. The Fabry-Perot probe 105 can detect the sound pressure of the photoacoustic wave 104 by emission of a measurement light 107 from an array light source 106 which is a measurement light source. The acoustic wave acquiring apparatus 113 is also provided with a controller 108 that controls the wavelength of the measurement light 107, which is emitted from the array light source 106, for each of the elements or each plurality of the elements. The acoustic wave acquiring apparatus 113 is also provided with an optical sensor 109 for measuring the reflected quantity of the measurement light 107 incident upon the Fabry-Perot probe 105 and converting the measured light quantity into an electrical signal. A half-mirror 114 guides and branches the measurement light.

The subject information acquiring apparatus is configured by further adding a processor 110 and a display unit 111 to the acoustic wave acquiring apparatus 113. The processor 110 performs signal processing, such as analysis, with respect to the signal obtained by the optical sensor 109, and the display unit 111 displays subject information, such as an optical property value distribution, obtained in the processor.

A variable-wavelength laser in which the wavelength can be controlled for each of the elements or each plurality of the elements is advantageous as the array light source 106. Further, in order to increase the change of reflectance when the acoustic wave is incident upon the Fabry-Perot probe 105, it is desirable that the array light source 106 operate in a single mode.

It is also desirable that the array light source 106 could change the wavelength within at least a wavelength range equal to or higher than the free spectral range (FSR) of the Fabry-Perot probe 105. The FSR, as referred to herein, is a distance between the adjacent resonance wavelengths.

It is also preferred that the array light source 106 could control the wavelength in a short time. With consideration for utility, it is preferred that the wavelength could be changed and stabilized, for example, within 1 sec. A one-dimensional array laser or a two-dimensional array laser can be used as the array light source 106. For example, a vertical-cavity surface-emitting laser array (VCSEL array) can be advantageously used.

Figure 9:
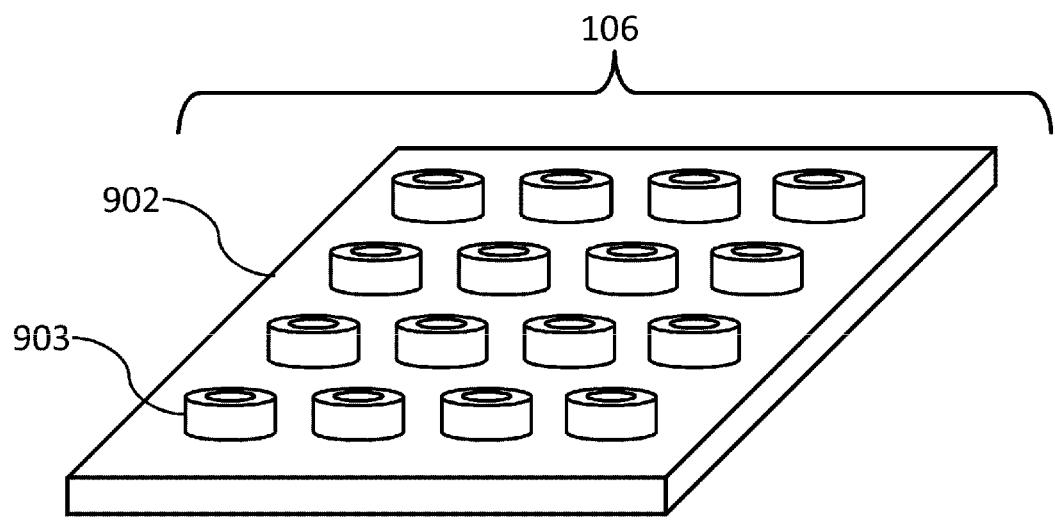
FIG. 9 shows an example of the configuration of a VCSEL array.

FIG. 9 shows the configuration of an array light source using a VCSEL. In the array light source 106, a total of 16 (4 columns by 4 rows of elements) of VCSEL 903 are arranged on a GaAs semiconductor substrate 902. A wiring (not shown in the figure) for supplying an electric current to each VCSEL is formed on the GaAs semiconductor substrate 902.

Figure 10:
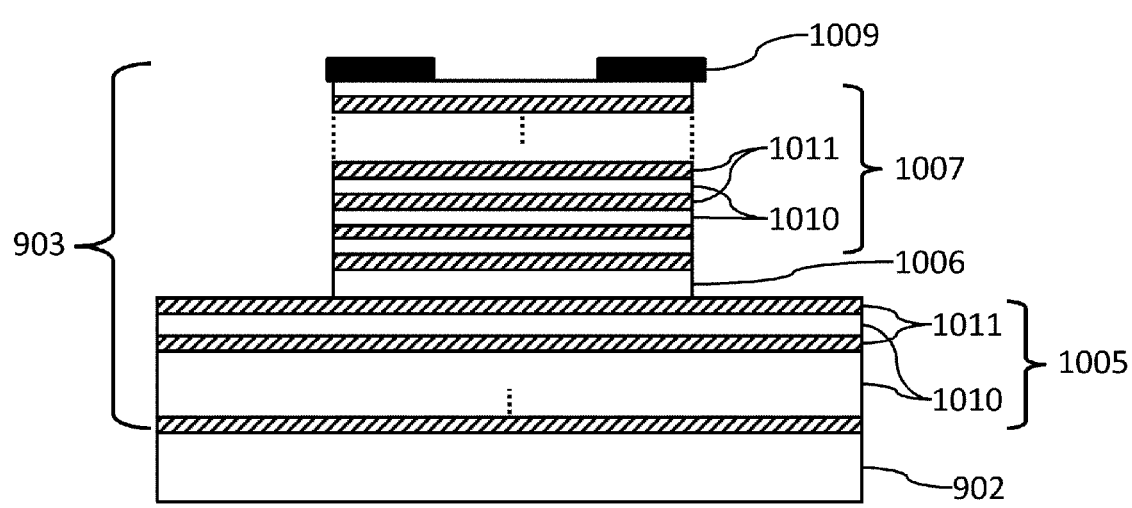
FIG. 10 shows an example of the configuration of each VCSEL.

The configuration of the VCSEL 903 is explained below with reference to FIG. 10. The VCSEL 903 is constituted by a lower multilayer film reflective mirror 1005, an active layer 1006, an upper multilayer film reflective mirror 1007, a back-surface electrode (not shown in the figure), and a ring electrode 1009 formed on the GaAs semiconductor substrate 902. The ring electrodes 1009 of the VCSEL 903 in the array light source 106 are electrically independent from each other and connected at a one-to-one ratio to a drive circuit. Therefore, the electric current supplied to each VCSEL can be controlled independently and each element can be driven at an optimum drive current value.

The multilayer film reflective mirrors 1005 and 1007 are constituted by alternately laminating semiconductors of two types, namely, $Al_{0.16}GaAs$ 1010 and $Al_{0.9}GaAs$ 1011. The film layers $Al_{0.16}GaAs$ 1010 and $Al_{0.9}GaAs$ 1011 have a thickness of 60 nm and 69 nm, respectively. Where those two semiconductor films are taken as a pair, the lower multilayer film reflective mirror 1005 is obtained by laminating 40 pairs. The upper multilayer film reflective mirror 1007 is obtained by laminating 25 pairs. The active layer 1006 is configured by a GaAs/AlGaAs quantum well, and causes induced amplification of light in an 850 nm wavelength band.

Because of the configuration in which the reflective mirrors 1005 and 1007 are thus disposed above and below the active layer 1006, the light reciprocates between the two reflective mirrors, and the light is amplified by the active layer 1006, thereby causing laser oscillations.

As described hereinabove, it is preferred that the laser light source operate in a single mode in the present acoustic wave acquiring device. The operation of the VCSEL in a single mode can be realized by introducing a transverse-mode control mechanism into the VCSEL structure. For example, the transverse-mode control mechanism can be obtained by reducing the non-oxidation diameter to below a predetermined size in an oxidation constriction structure described in Patent Literature 1. In the VCSEL of the present embodiment, the predetermined size is 3.5 µm. The transverse-mode control mechanism may be also obtained in a different manner by using a surface structure for transverse-mode control at the uppermost layer of VCSEL, or by using a long-cavity structure such as described in Patent Literature 1.

The structure from the lower multilayer film reflective mirror 1005 to the upper multilayer film reflective mirror 1007 is produced by using a semiconductor thin film that has been homogeneously in-plane grown by a crystal growth process on the GaAs substrate 1002. Therefore, by changing the processing pattern in the in-plane direction in the process of processing the semiconductor thin film, it is possible to produce a plurality of VCSEL 903 simultaneously in one process. In other words, a two-dimensional VCSEL array can be easily produced.

The following advantages are obtained by using such a VCSEL array, which has been produced in a batch mode from the same substrate, as the array light source of the imaging device.

The first advantage is that beams emitted from the plurality of VCSEL have good uniformity of emission directions. When end-emission lasers or other light sources different from the vertical-cavity surface-emission lasers are disposed in an array configuration, the emission directions are varied depending on the surface accuracy of the substrate where the light sources are disposed, the thickness of an adhesive for fixing the light sources, and the mounting accuracy of the disposed devices. Meanwhile, in the case of the VCSEL array produced in a batch mode, the inclination of the light emission surface and the beam emission direction of the VCSEL are determined only by the surface accuracy of the semiconductor substrate used for crystal growth. Further, in thin films that can be realized with today's attainable processing accuracy of semiconductor substrates and available crystal growth devices, a very high accuracy can be easily realized, with this accuracy being higher by one or more differences in power than the accuracy realizable with the abovementioned mounting. For this reason, by using the VCSEL, it is possible to produce an array light source with aligned beam emission directions.

The second advantage is a low production cost. When a plurality of light sources is disposed on a single substrate, each individual light source should be processed. Meanwhile, in the case of the VCSEL array, the array can be automatically formed in a batch mode on the substrate, the number of processing operations is decreased, and the cost can be reduced. In particular, when an array having a large number of light sources is needed, the presence or absence of a mounting step makes a big difference.

The third advantage is that the distance between the light sources is reduced. Independent semiconductor chips or other light sources cannot be disposed two dimensionally with a pitch equal to or less than 100 µm at realistic cost and yield. Meanwhile, since in the VCSEL the diameter of an element is equal to or less than 30 µm, and photolithography used in the semiconductor processing process has an accuracy equal to or less than 1 µm, batch production of VCSEL arrays with a pitch less than 100 µm can be easily realized.

Further, as indicated hereinabove, a single unit of VCSEL features a small time constant of an increase in active layer temperature. It means that wavelength adjustment with an electric current is performed at a higher speed. Yet another advantage is that since the emitted beam is a round beam with a small spread, the spatial optical system is simplified.

Because of the above-described advantages, the VCSEL array can be advantageously used in the present invention.

The controller 108 shown in FIG. 1 controls the electric current injected into the array light source 106 for each of the elements or each plurality of the elements, thereby making it possible to control the wavelength of the measurement light 107 emitted from the array light source 106 for each of the elements or each plurality of the elements. In this case, the wavelength of the each measurement light 107 emitted from the array light source 106 is controlled according to the resonance length (or cavity length) of the light at the incidence point on the Fabry-Perot probe 105. More specifically, it is preferred that the optimum wavelength be used at which the sensitivity at each position of the Fabry-Perot probe reaches a maximum. In other words, it is preferred that a wavelength be used at which the change of reflectance occurring when an acoustic wave is incident upon the Fabry-Perot probe 105 reaches a maximum.

As a means for setting to such an optimum wavelength, wavelength sweeping is performed by the controller 108 for each of the elements or each plurality of the elements, and the dependence of the reflectance on the wavelength is measured. A method of setting, for each element, to a wavelength at which the obtained change of reflectance reaches a maximum as the wavelength changes can be considered. In this case, for example, the setting is made to a wavelength at which the absolute value of the derivative of reflectance with respect to wavelength is the largest.

In order to enable the controller 108 to control the wavelength of the measurement light 107 for each of the elements or each plurality of the elements, for example, a method for controlling the element temperature of the array light source 106 for each of the elements or each plurality of the elements can be used. The controller 108 is typically constituted by an arithmetic unit such as a central processing unit (CPU).

Figure 2:
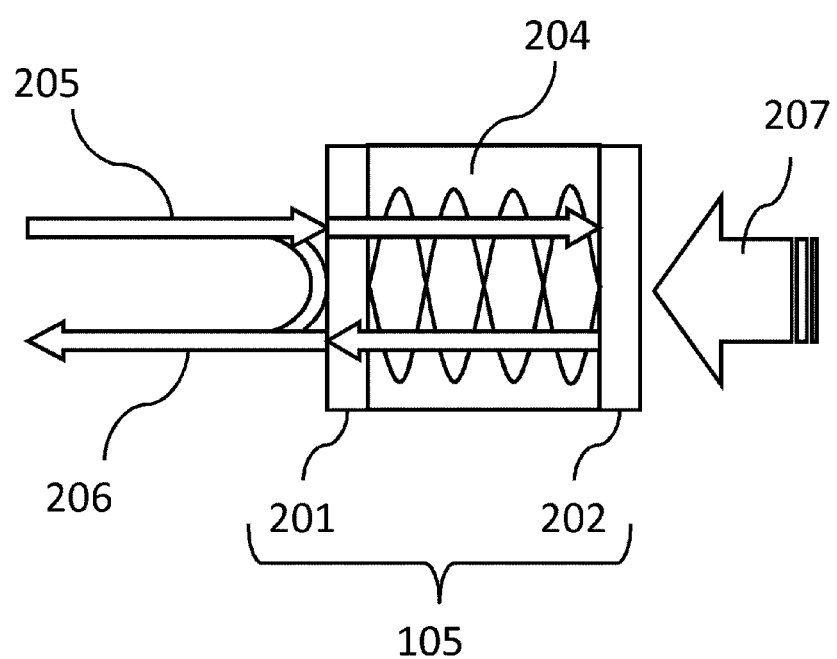
FIG. 2 shows an example of the configuration of a Fabry-Perot interferometer.

FIG. 2 is a schematic diagram of an acoustic wave detector using optical resonance.

The Fabry-Perot probe 105 has a structure in which a polymer film 204 having a thickness d is sandwiched between a first mirror 201 and a second mirror 202. The first mirror 201 is on the incidence side of the measurement light, and the second mirror 202 is on the incidence side of the acoustic wave. The measurement light source emits incident light 205 from the side of the first mirror 201 to the interferometer.

In this case, the light quantity Ir of a reflected light 206 is represented by the following Eq. (1).

[Math. 1]

$$I_r = \frac{4R \sin^2 \frac{\varphi}{2}}{(1-R)^2 + 4R \sin^2 \frac{\varphi}{2}} I_i \quad (1)$$

$$\varphi = \frac{4\pi}{\lambda_0} nd \quad (2)$$

Here, Ii is the light quantity of the incident light 205, R is the reflectance of the first mirror 201 and the second mirror 202, $\lambda_0$ is the wavelength of the incident light 205 and the reflected light 206, d is the inter-mirror distance, n is the refractive index of the polymer film 204. Here, φ corresponds to a phase difference in the case of reciprocation between two mirrors and is represented by Eq. (2).

Figure 7A:
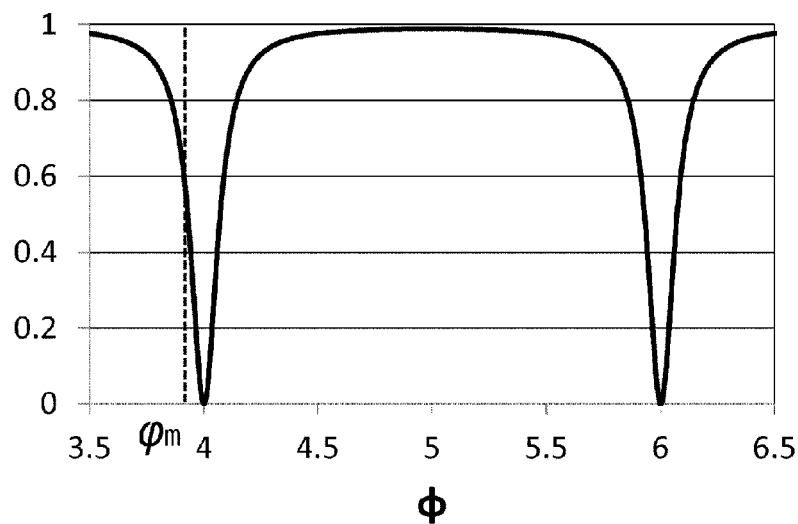
FIGS. 7A and 7B are set of graphs showing a change in the reflectance of the Fabry-Perot interferometer.

FIG. 7A shows an example of graphic representation of the reflectance Ir/Ii as a function of φ. The reflected light quantity Ir drops periodically, and the reflectance reaches a minimum when φ=2 mπ (m is a natural value). Where an acoustic wave 207 is incident upon the Fabry-Perot probe, the inter-mirror distance d changes. As a result, φ changes and, therefore, the reflectance Ir/Ii also changes. By measuring changes in the reflected light quantity Ir, it is possible to detect the incident acoustic wave 207. The larger is the reflected light quantity change, and higher is the intensity of the incident acoustic wave 207.

To ensure a large change of the reflected light quantity Ir when the acoustic wave 207 is incident, it is necessary that the change rate of the reflectance Ir/Ii with respect to the change of φ be large. In FIG. 7, it is clear, that the slope of the graph is the steepest and the change rate is large at $\varphi_m$. Therefore, it is preferred that measurements in the Fabry-Perot probe be performed after matching the phase difference with $\varphi_m$. The phase difference can be matched with $\varphi_m$ by adjusting the wavelength $\lambda_0$ of the incident light.

Figure 7B:
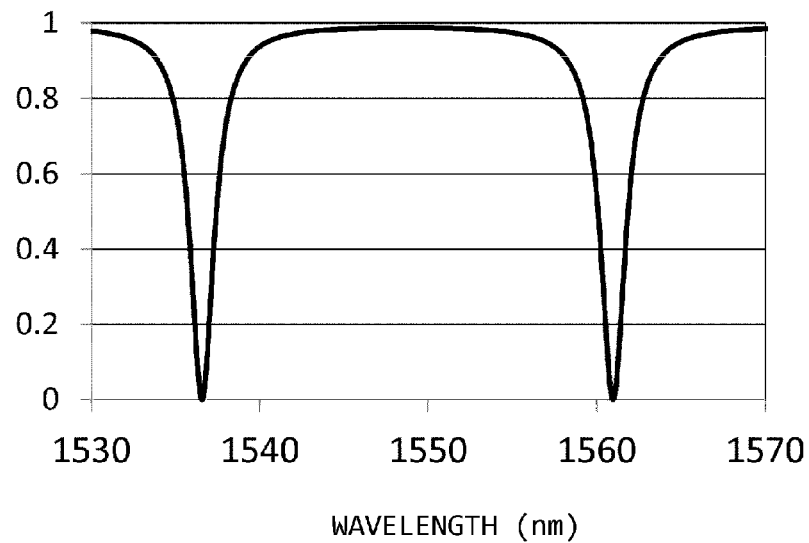

In FIG. 7B, the reflectance Ir/Ii is graphically represented as a function of the wavelength $\lambda_0$. Where the wavelength at which the change rate of the reflectance Ir/Ii is the largest is denoted by $\lambda_m$ (not shown in the figure), matching the measurement wavelength with the wavelength $\lambda_m$ is equivalent to matching the phase difference with $\varphi_m$, and the sensitivity reaches a maximum. By performing measurements in the Fabry-Perot probe after the measurement wavelength $\lambda_0$ has thus been adjusted and the phase difference has been matched with $\varphi_m$, it is possible to obtain a high reception sensitivity.

In the Fabry-Perot probe, the reflected light quantity change is measured only at a position where the incident light 205 is incident. Therefore, the spot region of the incident light 205 is a region with reception sensitivity. Accordingly, where a lens or the like is used to constrict the incident light 205, the reception area is reduced. As a result, the spot with reception sensitivity is reduced in size and, therefore, the resolution of the image during reconstruction is increased. Further, the Fabry-Perot probe has a reception frequency band of the acoustic wave larger than that of probes using PZT. For those reasons, by using the Fabry-Perot probe, it is possible to obtain a high-resolution and high-definition image.

Figure 3:
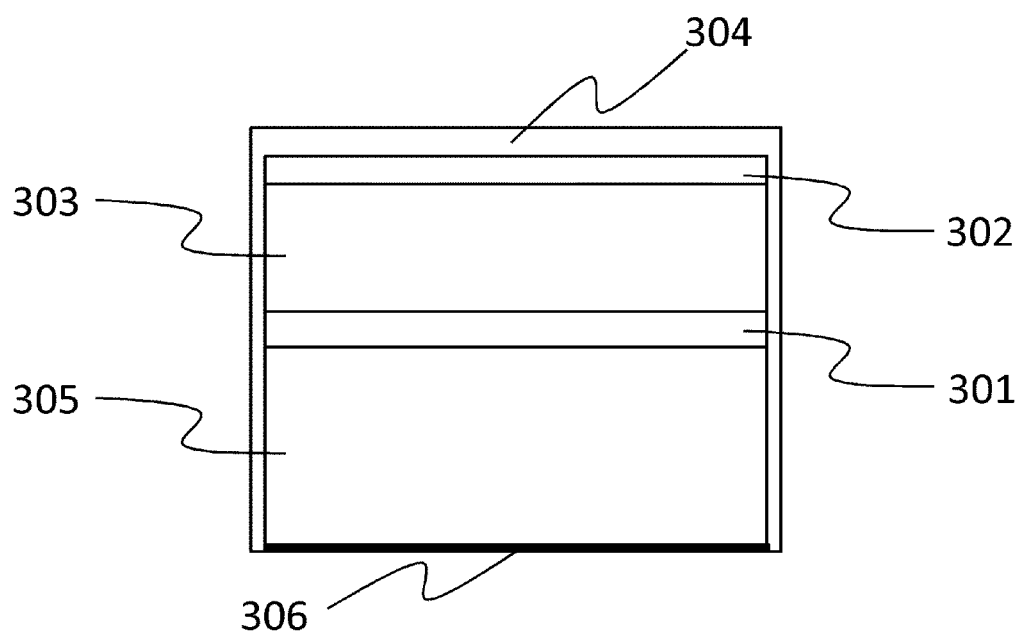
FIG. 3 shows an example of the structure of a Fabry-Perot probe.

FIG. 3 illustrates the cross-sectional structure of the Fabry-Perot probe. A dielectric multilayer film or a metal film can be advantageously used as a material for the first mirror 301 and the second mirror 302. A spacer film 303 is present between the mirrors. The spacer film 303 preferably demonstrates large strains when an elastic wave is incident upon the Fabry-Perot probe. For example, an organic polymer film can be used for the spacer film. Examples of materials for the organic polymer film include Parylene, SU8, and polyethylene. An inorganic film may be also used as the spacer film 303, provided that the film deforms when a sound wave is received.

However, when an organic polymer film is formed, a film thickness variation can easily occur. As follows from Eq. (2), where the variation is present in the inter-mirror distance d (cavity length), the wavelength $\lambda_0$ of the measurement light should be adjusted to match the inter-mirror distance d for each position over the probe surface in order to maintain a constant reception sensitivity of acoustic wave over the probe surface. In order to increase further the reception sensitivity, it is preferred that the wavelength be matched with the optimum wavelength $\lambda_m$ at each position. In other words, in the produced interferometer, since the cavity length differs depending on a position, the resonance wavelength of the measurement light also differs depending on a position. For this reason, the controller should measure the wavelength of the measurement light from each element so as to correspond to the cavity length at each position.

The entire Fabry-Perot probe is protected with a protective film 304. A material obtained by forming a thin organic polymer film such as Parylene or inorganic film such as $SiO_2$ can be used as the protective film 304. Glass or acryl can be used for a substrate 305 where the first mirror 301 is to be formed. In this case, the wedge-shaped substrate 305 is preferably used to reduce the effect of light interference inside the substrate 305. It is also preferred that the substrate be subjected to AR coat processing 306 to avoid light reflection at the surface of the substrate 305.

A two-dimensional array-type or one-dimensional array-type optical sensor (photodiode) can be used as the array-type optical sensor 109. For example, a CCD sensor or a CMOS sensor is preferred as the optical sensor. However, other optical sensors can be also used, provided that the reflected light quantity of the measurement light 107 can be measured and converted into an electrical signal when the photoacoustic wave 104 is incident upon the Fabry-Perot probe 105.

In the configuration shown in FIG. 1, the half-mirror 114 is used as an optical system for guiding the measurement light 107 to the Fabry-Perot probe 105 or the optical sensor 109. However, a configuration using a polarization mirror or a wavelength plate instead of the half-mirror 114 can be also used, provided that the reflected light quantity in the Fabry-Perot probe 105 can be measured.

It is preferred that an optical system for collimating or collecting light be used when the measurement light 107 is guided. In this case, a combination of lenses or the like can be used.

The excitation light 103 emitted towards the subject 102 in order to generate a photoacoustic wave uses light of a wavelength that can be absorbed by a specific component from among the components constituting the subject 102. Pulsed light is preferred as the excitation light 103. The period of the pulsed light is of an order of several picoseconds to several hundreds of nanoseconds, and when the subject is a living organism, the pulsed light with a period of several nanoseconds to several tens of nanoseconds is particularly preferred.

A laser is preferred as the excitation light source 101 that generates the excitation light 103. However, a light-emitting diode or a flash lamp can be used instead of the laser. Lasers of various types, such as a solid-state laser, a gas laser, a dye laser, and a semiconductor laser, can be used. Where a dye laser or an OPO (optical parametric oscillators) laser in which the oscillation wavelength can be converted, or a titanium sapphire laser and an alexandrite laser is used, a difference in the optical property value distribution caused by the wavelength can be also measured.

Concerning the wavelength of the light source to be used, a range from 700 nm to 1100 nm, in which the absorption in a living organism is small, is preferred. However, a wavelength range, for example, from ultraviolet to median infrared (200 nm to 1600 nm), which is wider than the aforementioned wavelength range, and further, a terahertz wave range, a microwave range, and a radio wave range can be also used.

In FIG. 1, the subject is irradiated with the excitation light 103 from a direction that is not blocked by the Fabry-Perot probe 105. However, by the excitation light 103 with a wavelength that can be transmitted by the mirror of the Fabry-Perot probe 105, it is also possible to irradiate with the excitation light 103 from the Fabry-Perot probe 105 side.

In order to detect efficiently with the Fabry-Perot probe 105 the photoacoustic wave 104 generated from the subject 102, it is desirable that an acoustic coupling medium be used between the subject 102 and the Fabry-Perot probe 105. In FIG. 1, water is used as the acoustic coupling medium to attain acoustic matching between the probe and the subject 102 disposed in a water tank 112. However, the acoustic coupling medium is not limited to water. For example, a configuration in which acoustic impedance matching gel is applied between the subject 102 and the Fabry-Perot probe 105 may be also used.

When the apparatus is used for medical applications, such as for measurements in which part of a human body is a subject, the water tank 112 is not used. In this case, an acoustic coupling medium is applied to the subject, that is, an affected area, and the measurements are performed by disposing the Fabry-Perot probe 105 thereupon in contact therewith. In this case, an acoustic coupling medium is used that ensures acoustic matching between the affected area and the Fabry-Perot probe 105, such as acoustic impedance matching gel.

The Fabry-Perot probe 105 detects the photoacoustic wave 104 as the light quantity change of the reflected light of the measurement light 107. The optical sensor 109 converts the light quantity change into an electrical signal.

It is preferred that the processor 110 normalize the electrical signal, which has been obtained by the optical sensor 109, by using the light quantity or light quantity change amount for each beam of the measurement light 107 emitted from the array light source 106. As a result, the variation in reception sensitivity over the surface of the Fabry-Perot probe 105 can be inhibited.

The processor 110 performs image reconstruction for obtaining subject information such as optical property value distribution from the distribution of the obtained electrical signal. Universal back-projection and phasing addition can be used as the reconstruction algorithm.

The processor 110 may be of any type, provided that the time-variable distribution of the electrical signal representing the intensity of the photoacoustic wave 104 and the measurement light quantity could be stored and converted into data on the optical property value distribution by a computational means. The processor 110 is typically constituted by an arithmetic unit such as a central processing unit (CPU), a graphics processing unit (GPU), an analog-to-digital (A/D) converter, a field programmable gate array (FPGA), or an application-specific integrated circuit (ASIC). Note that the processor 110 may be constituted not only by a single arithmetic unit but also by a plurality of arithmetic units.

When light with a plurality of wavelengths is used as the excitation light 103, optical coefficients in the living organism are calculated for each wavelength and the values of the coefficients are compared with a wavelength dependence inherent to the substance (glucose, collagen, oxyhemoglobin/deoxyhemoglobin) constituting the tissue of the living organism. As a result, the density distribution of the substance constituting the living organism can be formed into an image.

It is desirable that the subject information acquiring apparatus include the display unit 111 that displays image information obtained by the signal processing. However, the configuration in which the subject information acquiring apparatus does not have a display unit and saves the generated image data or outputs the generated data to an external display device can be also used.

Figure 8:
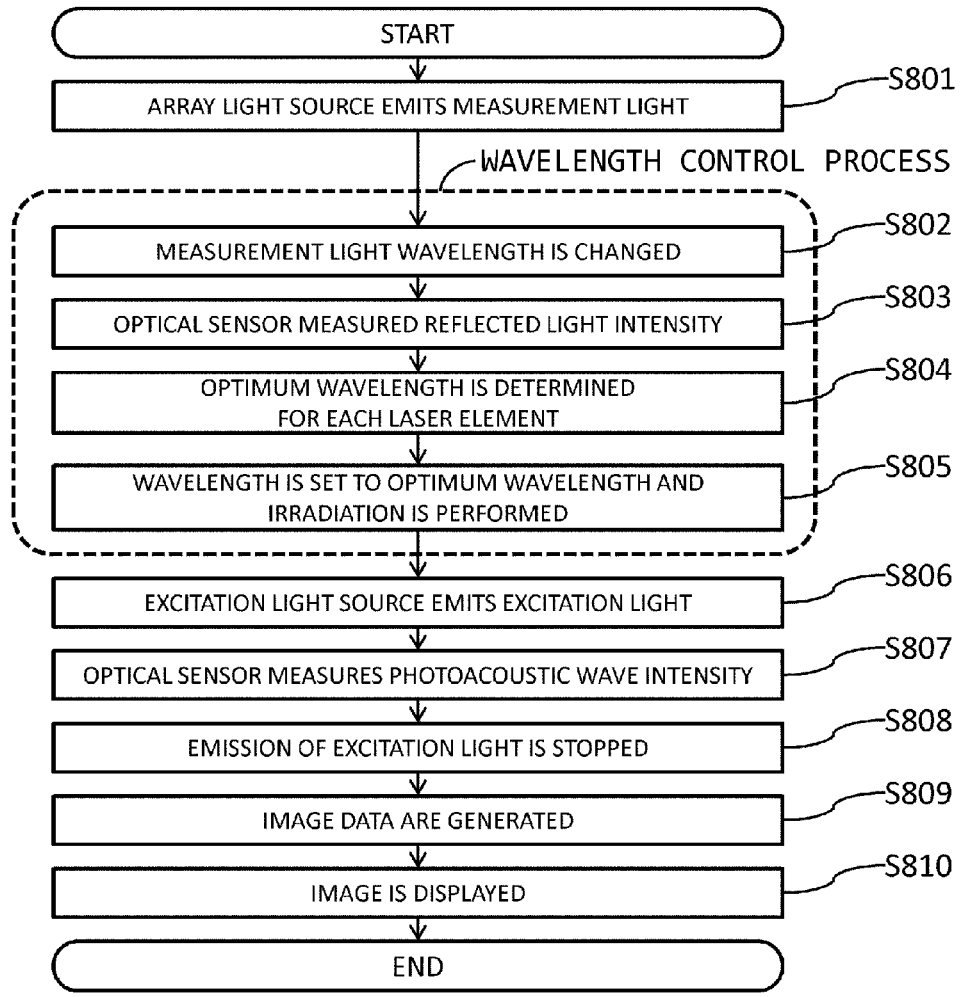
FIG. 8 is a flowchart showing an example of processing performed by the object information acquiring apparatus.

The measurement flowchart of the present embodiment is shown in FIG. 8.

In step S801, the measurement light 107 is emitted from the array light source 106. The processing then advances to the wavelength control process shown in the figure in a dot-line box.

In step S802, the controller 108 changes the wavelength of the measurement light 107. In step S803, the optical sensor 109 measures the reflected light intensity and acquires the measurement results as 2D data. In step S804, the optimum wavelength is determined for each laser element. The measurement light is emitted at the optimum wavelength that has thus been determined (step S805).

It is preferred that wavelength sweeping and calculation of the optimum wavelength be performed automatically in the above-described wavelength control process. However, the optimum wavelength setting may be also performed manually.

In step S806, the excitation light source 101 irradiates the subject with pulsed light as the excitation light 103. As a result, a photoacoustic wave is generated from the subject, and part thereof is incident upon the Fabry-Perot probe 105. As a result, the inter-mirror distance changes and the reflectance of the measurement light also changes.

In step S807, the optical sensor 109 measures the reflected light, thereby acquiring the intensity of the photoacoustic wave. In step S808, the excitation light source 101 stops the emission of light.

In step S809, the processor 110 performs image reconstruction with respect to the electric signal, which is derived from the photoacoustic wave and obtained by the optical sensor, and generates image data on the inside of the subject. In step S810, the image is displayed on the display unit 111.

By using the above-described subject information acquiring apparatus, it is possible to measure the sound pressure distribution accurately in a batch mode by using the Fabry-Perot probe 105. Further, the difference in element sensitivity caused by the difference in the inter-mirror distance between the positions can be corrected.

Embodiment 2

Figure 4:
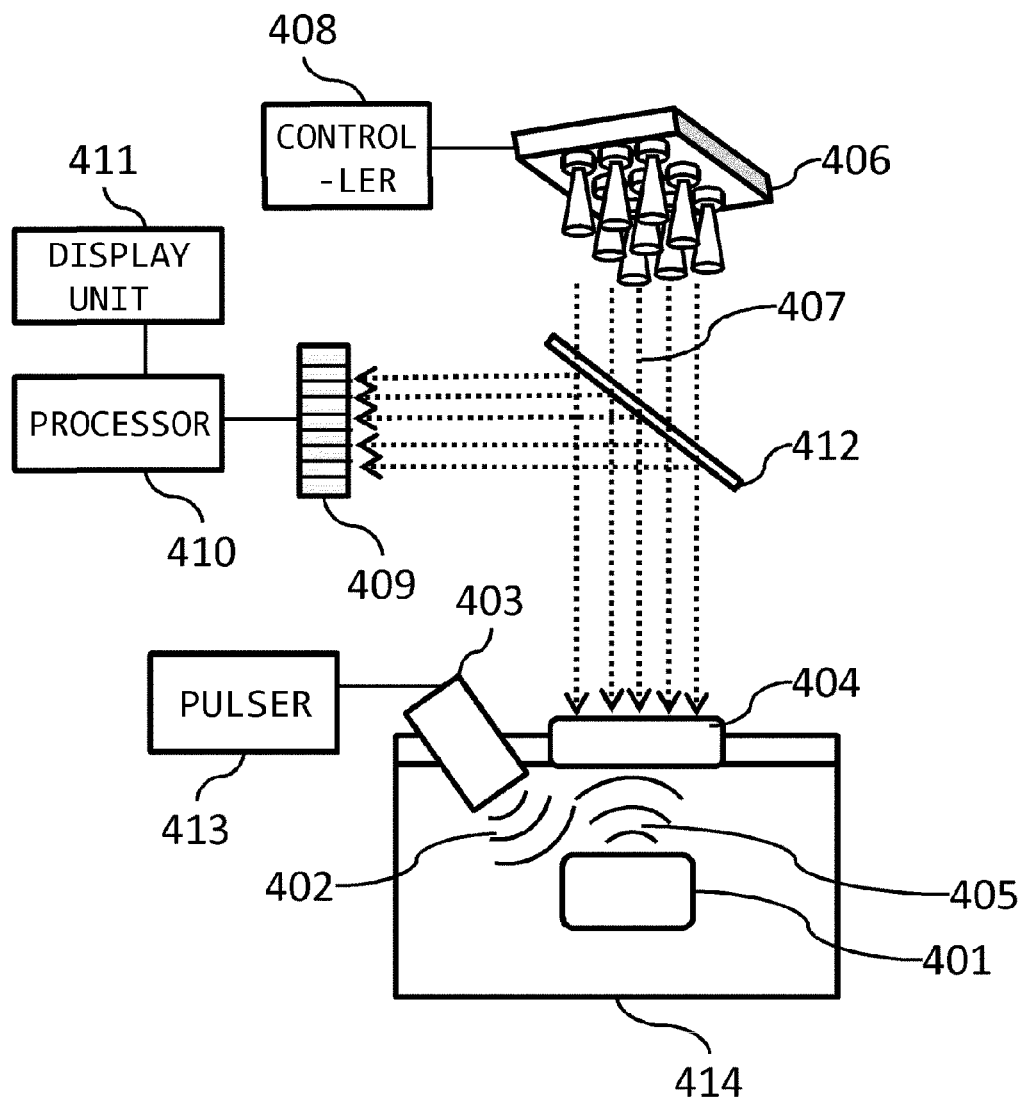
FIG. 4 shows an example of the configuration of the subject information acquiring apparatus according to Embodiment 2.

FIG. 4 shows an example of apparatus configuration in the present embodiment.

In the subject information acquiring apparatus of the present embodiment, the acoustic impedance distribution inside a living body is converted into an image by using ultrasound echo technique. Detailed explanation of features same as those in Embodiment 1 is herein omitted.

The subject information acquiring apparatus of the present embodiment is provided with a transducer 403 that transmits an elastic wave 402 to a subject 401, and a pulser 413 for driving the transducer 403. The elastic wave 402 is reflected at the interface of a tissue with a different acoustic impedance, such as a tumor, inside the subject 401 and becomes an elastic wave 405.

Other features of the present embodiment are same as those of Embodiment 1. Thus, a Fabry-Perot probe 404 is irradiated with a measurement light 407 from an array light source 406, which is the measurement light source, and detects the sound pressure of an elastic wave 405 which is the ultrasound echo. Further, a controller 408 controls the wavelength of the measurement light 407 emitted from the array light source 406 for each of the elements or each plurality of the elements. An optical sensor 409 measures the quantity of the reflected light of the measurement light 407 and converts the measurement result into an electrical signal. A processor 410 performs signal processing, such as analysis, with respect to the electrical signal obtained by the optical sensor 409, and a display unit 411 displays the acoustic impedance distribution information obtained by the processor.

The requirements applied to the array light source 406, for example, controllability in element units, operation in a single mode, and wavelength change in a short time, are the same as in Embodiment 1. From the standpoint of those requirements, a VCSEL array is preferred as a material for the array light source 406. It is preferred that an optimum wavelength at which the sensitivity of the Fabry-Perot probe at each position reaches a maximum be used as the wavelength of the measurement light 407 in the VCSEL array. In other words, it is preferred that a wavelength be used at which a change in reflectance when a photoacoustic wave is incident upon the Fabry-Perot probe 404 reaches a maximum. A means therefor is the same as in Embodiment 1.

In the present embodiment, the material, structure, and functions of the array-type optical sensor 409 and half-mirror 412 are the same as those of the optical sensor 109 and half-mirror 114 of Embodiment 1.

An acoustic coupling medium is used between the subject 401 and the Fabry-Perot probe 404 in order to detect efficiently the elastic wave 405, which is reflected by the subject, with the Fabry-Perot probe 404. In FIG. 4, water disposed in a water tank 414 is used as the acoustic coupling medium, in the same manner as in FIG. 1. When a human body is the subject, acoustic impedance matching gel is used.

Further, the detection processing of the reflected elastic wave 405 with the optical sensor 409 is the same as in Embodiment 1.

Phasing addition can be used as signal processing performed by the processor 410 in order to obtain the acoustic impedance distribution for the distribution of the obtained electrical signals.

The image display with the display unit 411 is also similar to that in Embodiment 1.

By using the above-described subject information acquiring apparatus, it is possible to measure the acoustic impedance distribution image accurately and in a batch mode by using the Fabry-Perot probe 404. In this case, the difference in element sensitivity caused by the difference in inter-mirror distance among the positions can be corrected.

Embodiment 3

Figure 5:
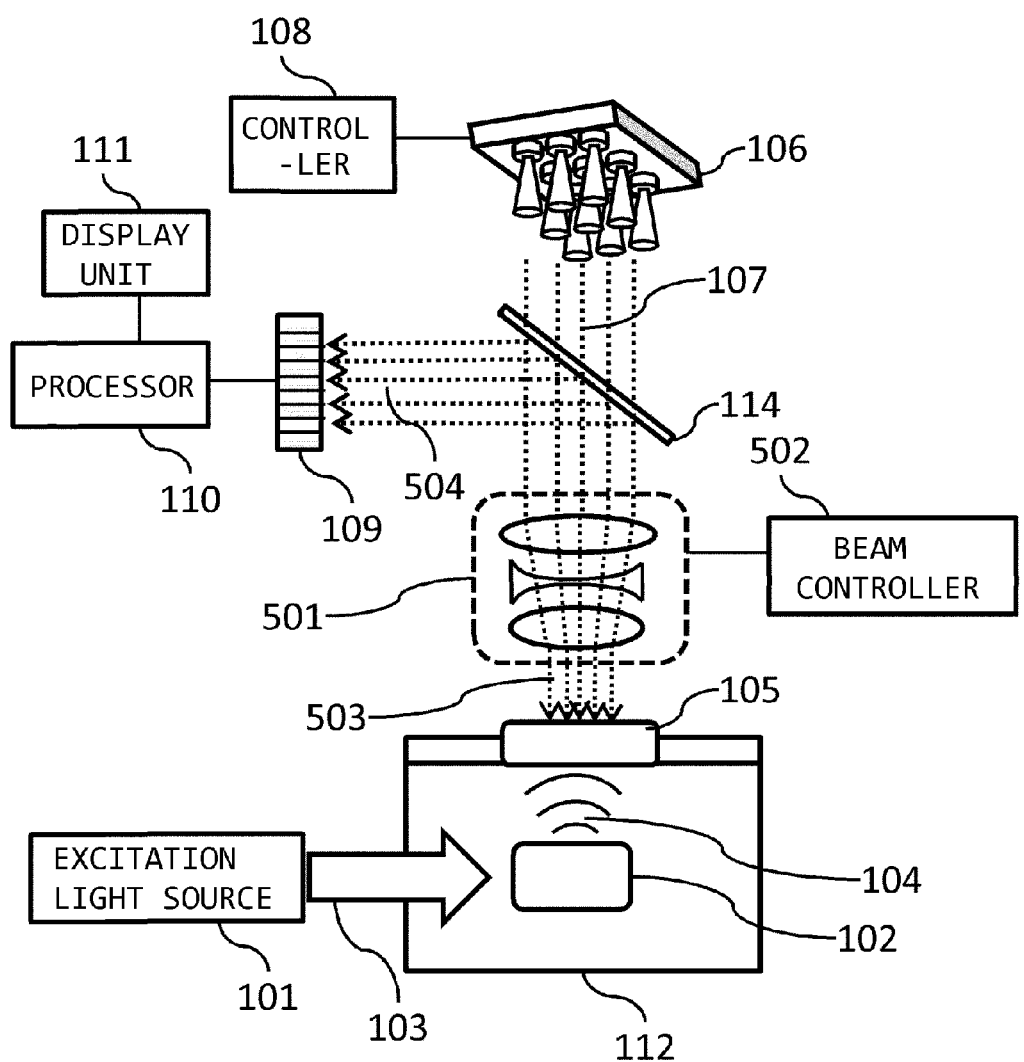
FIG. 5 shows an example of the configuration of the subject information acquiring apparatus according to Embodiment 3.

FIG. 5 shows an example of apparatus configuration in the present embodiment.

In the subject information acquiring apparatus of the present embodiment, the resolution or image capturing range is changed during the measurements. Detailed explanation of features same as those in Embodiment 1 is herein omitted.

The subject information acquiring apparatus of the present embodiment differs from that of Embodiment 1 in that a beam optical system 501 and a beam controller 502 are provided in part of the acoustic wave acquiring apparatus. The beam optical system 501 changes the beam diameter of the measurement light. The beam controller 502 controls changes of the beam diameter.

When the measurement light 107 emitted from the array light source 106 passes through the beam optical system 501, the beam diameter changes. The measurement light then becomes incident light 503 which is incident upon the Fabry-Perot probe 105. After the incident light 503 is reflected by the Fabry-Perot probe, the light again passes through the beam optical system 501. The beam diameter of reflected light 504 returns to the size before the incident light 503 passed through the beam optical system 501. The reflected light 504 is then incident upon the array-type optical sensor 109, thereby making it possible to obtain the reflection intensity distribution on the Fabry-Perot probe 105.

A zoom lens optical system can be advantageously used as the beam optical system 501 for changing the beam diameter of the measurement light. The beam lens optical system is constituted, for example, by a combination of convex lenses and concave lenses. The beam diameter can be freely changed by controlling the distance between the lenses with the beam controller 502.

It is desirable that the beam optical system 501 be a telecentric optical system. It is also desirable that the optical sensor 109 be an array-type optical sensor. In this case, in order to associate the pixels on the array-type optical sensor 109 with the positions on the Fabry-Perot probe 105, it is desirable that the beam optical system 501 be a two-side telecentric optical system.

When the beam diameter of the incident light 503 is reduced using the beam optical system 501, the irradiation area of the incident light 503 on the Fabry-Perot probe 105 is reduced by comparison with that when the beam optical system 501 is not used. Meanwhile, since the beam diameter when the reflected light 504 is incident upon the array-type optical sensor 109 is reduced to the initial size of laser emission when the beam passes through the beam optical system 501, the beam diameter is not changed. In other words, as a result of using the beam optical system 501, the corresponding spot area on the Fabry-Perot probe 105 per one pixel on the array-type optical sensor 109 is reduced. Therefore, the resolution of the obtained image increases. Further, since the beam diameter of the incident light 503 incident upon on the Fabry-Perot probe 105 is small, the image capturing region is narrowed.

Conversely, when the beam diameter of the incident light 503 is increased by using the beam optical system 501, the resolution decreases, but the image capturing region is widened.

Thus, the resolution and image capturing region are changed by changing the beam diameter of the measurement light 503 by using the beam optical system 501. The operator may use the beam controller 502 to control the beam optical system according to the desired resolution or image capturing range. For example, in the case of a zoom lens optical system, zoom control is performed.

Further, when the processor 110 performs image reconstruction, adequate data processing can be performed and the image can be improved by changing the reconstruction region and voxel pitch according to the beam diameter of the incident light 503. Thus, when the beam diameter if large, the resolution is low, but the image capturing region is wide. Therefore, the reconstruction region is also a wide region corresponding to the spot region of the beam, thereby making it possible to increase the voxel pitch.

In FIG. 5, the optical system 501 is disposed between the Fabry-Perot probe 105 and the half-mirror 114. However, by disposing the optical system 501 between the array light source 106 and the half-mirror 114, it is possible to change only the image capturing range, without changing the resolution.

Further, by disposing the optical system 501 between the optical sensor 109 and the half-mirror 114, it is possible to change only the resolution, without changing the image capturing range.

In the present embodiment, the ultrasound echo technique can be also used, as in Embodiment 2, when converting the acoustic impedance distribution inside a living a body into an image.

By using such a subject information acquiring apparatus, it is possible to obtain an image while changing the resolution or imaging region during image capturing by using the Fabry-Perot probe 105. In this case, the advantages of accurately measuring the sound pressure distribution in a batch mode and correcting the difference in sensitivity among the positions can be enjoyed as they are.

EXAMPLE 1

Examples in which the present invention is used for actual acoustic wave acquisition are explained below. The subject information acquiring apparatus of the present example has the configuration explained in Embodiment 1.

In the present example, a sample obtained by solidifying a 1% aqueous solution of intralipid with agar and disposing a light-absorbing rubber wire with a diameter of 300 μm therein is used as the subject. The sample is disposed in water.

Dielectric multilayer films are used as the first mirror and second mirror of the Fabry-Perot probe. The dielectric multilayer films are designed to have a reflectance equal to or greater than 95% at 830 nm to 870 nm. BK7 is used as the substrate of the Fabry-Perot probe, and the surface of the substrate on the side opposite that where the dielectric multilayer film is formed is subjected to AR coat processing to obtain a reflectance equal to or less than 1% at 830 nm to 870 nm. Parylene C is used as the inter-mirror space film, and the film thickness is 30 μm. Parylene C is also used as the protective film for the probe.

A measurement light source emitting the measurement light is a wavelength-variable light source. A VCSEL array with a wavelength variable in a range close to 850 nm is used as the measurement light source. The array number is 8×8=64 channels, and the array pitch is 200 μm.

The positions on the Fabry-Perot probe are irradiated with the light emitted from the elements of the VCSEL array. The measurement light (reflected light) reflected from the Fabry-Perot probe is made incident upon a high-speed CMOS camera, which is an optical sensor, by the half-mirror and measured.

As advance preparation performed before the photoacoustic wave for subject image generation is measured, the reflectance of the emitted light from each element of the VCSEL array is measured with the high-speed CMOS camera while changing the input current. The input current is then set such that the amount of change in reflectance is the largest for each element. This processing corresponds to the wavelength control process in FIG. 8.

In such an apparatus, the subject is irradiated with the excitation light and the measurements of the photoacoustic wave are started. The excitation light source is a titanium sapphire laser, the repetition frequency of the emitted pulsed light is 10 Hz, the pulse width is 10 ns, and the wavelength is 797 nm.

Image reconstruction is then performed according to a universal back-projection algorithm by using the distribution of electrical signal based on the detected photoacoustic wave. As a result, imaging of the rubber wire in the intralipid 1% agar, which is a light diffusion medium, can be performed. This processing corresponds to steps S806 to S810 in FIG. 8.

Thus, in the present example, it is shown that the photoacoustic wave can be measured under detailed wavelength control with the Fabry-Perot probe with respect to a model sample by using the apparatus having the configuration explained in Embodiment 1.

EXAMPLE 2

The subject information acquiring apparatus of the present example has the configuration explained in Embodiment 2. Thus, in the present example, the apparatus measuring an echo ultrasound wave, rather than a photoacoustic wave, such as shown in FIG. 4, is explained.

The configurations of the Fabry-Perot probe, optical system, and optical sensor of the present example are the same as in Example 1 and the detailed explanation thereof is herein omitted.

In the present example, a sample obtained by solidifying a 1% aqueous solution of intralipid with agar and disposing a polyethylene wire with a diameter of 300 μm therein is used as the subject. The sample is disposed in water.

The measurement light source used in the present example is constituted by a VCSEL array similar to that of Example 1.

The positions on the Fabry-Perot probe are irradiated with the light emitted from the elements of the VCSEL array. The measurement light (reflected light) reflected from the Fabry-Perot probe is guided by the half-mirror to a high-speed CCD camera, which is an optical sensor, and measured.

Before the echo ultrasound wave for subject image generation is measured, the reflectance of the emitted light from each element of the VCSEL array is measured with the high-speed CCD camera while changing the input current. The input current is then set such that the amount of change in reflectance is the largest for each element.

In such an apparatus, the subject is irradiated with an elastic wave by using a transducer with a center frequency of 20 MHz. The transducer is of a piezoelectric type, and PZT is used as a material thereof. The elastic wave is emitted as a pulsed wave by using a pulser, and the repetition frequency of the elastic wave is 1 KHz.

The echo wave obtained by reflection of the elastic wave inside the subject is then measured with the Fabry-Perot probe. The acoustic impedance distribution inside the subject is converted into an image according to a reconstruction algorithm using phasing addition by using the signals obtained. As a result, imaging of the polyethylene wire in the agar is performed.

As follows from the above, an acoustic wave can be also acquired by using the present invention in the imaging apparatus using the ultrasound echo technique.

EXAMPLE 3

The subject information acquiring apparatus of the present example has the configuration explained in Embodiment 3. Thus, it is the apparatus having a beam optical system and a beam controller, such as shown in FIG. 5.

Since the Fabry-Perot probe of the present example is similar to that of Example 1, detailed explanation thereof is herein omitted.

An example in which the present invention is used for actual acoustic wave acquisition is explained below. The imaging apparatus of the present example has the configuration described in Embodiment 3.

In the present example, a sample obtained by solidifying a 1% aqueous solution of intralipid with agar and disposing a light-absorbing rubber wire with a diameter of 300 μm therein is used as the subject. The sample is disposed in water.

A VCSEL array with a wavelength variable in a range close to 850 nm is used as the measurement light source emitting the measurement light. The array number is 8×8=64 channels, and the array pitch is 2 mm.

The measurement light emitted from the measurement light source is spread by a convex lens. After passing through a half-mirror, the light is adjusted to the desired beam diameter and made incident upon the Fabry-Perot probe by a zoom lens controlled by the controller.

Figure 6:
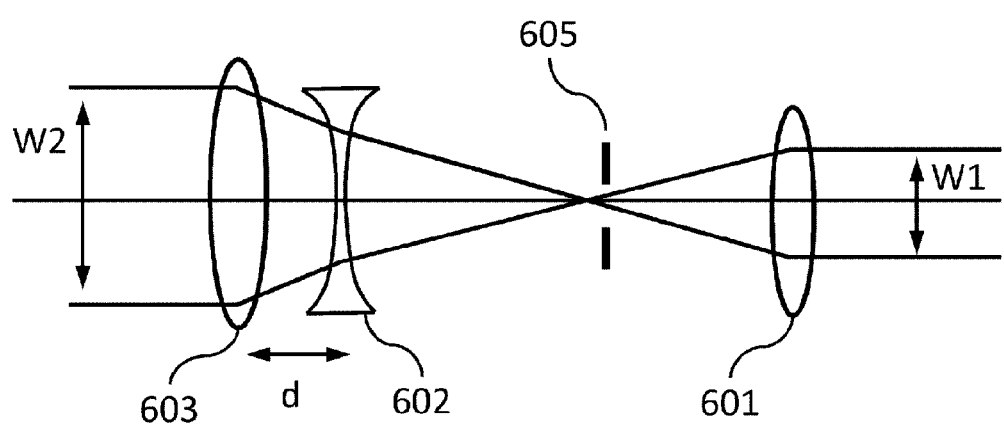
FIG. 6 shows an example of the configuration of a zoom optical system.

The optical system configured as shown in FIG. 6 is used as the zoom lens optical system. The focal distance of a convex lens 601 is 80 mm, the focal distance of a concave lens 602 is −80 mm, and the focal distance of a convex lens 703 is 60 mm.

In this case, the distance d between the concave lens 602 and the convex lens 603 is made 40 mm and the combined focus of the concave lens 602 and the convex lens 603 is moved by the controller to arrive at a focal position 605 of the convex lens 601.

The measurement light (reflected light) reflected in the Fabry-Perot probe is made incident upon a high-speed CMOS by a half-mirror and measured. The size of the high-speed CMOS camera is 100×100 pixels.

In such an apparatus, the subject is irradiated with the excitation light and a photoacoustic wave is measured.

Image reconstruction is then performed according to a universal back-projection algorithm by using the distribution of electrical signal based on the detected photoacoustic wave. During the reconstruction, the voxel pitch is 0.5 mm. As a result, imaging of the rubber wire in the intralipid 1% agar, which is a light diffusion medium, is performed in a 16-mm square image capturing region.

In this case, the distance d between the concave lens 602 and the convex lens 603 is made 10 mm and the combined focus of the concave lens 602 and the convex lens 603 is moved by the controller to arrive at the focal position 605 of the convex lens 601. The irradiation region of the measurement light incident upon the Fabry-Perot probe is an 8-mm square. Image reconstruction is performed using the distribution of the photoacoustic signals obtained after the measurement. The voxel pitch during the reconstruction is 0.25 mm. As a result, imaging of the rubber wire in the intralipid 1% agar, which is a light diffusion medium, is performed with a higher resolution in the 8-mm square image capturing region.

It follows from the above, that where a beam optical system combining a plurality of lenses is used, as in the present example, the beam diameter of the VCSEL array is changed, for example, as in the beam diameter conversion between that shown by a symbol W2 and that shown by a symbol W1 in FIG. 6. As a result, the image capturing region and resolution can be adjusted during the photoacoustic measurements using the Fabry-Perot probe.

As indicated in the above-described example, in accordance with the present invention, the sound pressure distribution can be measured accurately in a batch mode in a subject information acquiring apparatus using a Fabry-Perot probe. As a result, medical diagnostic of a living body as a subject, and nondestructive inspection of a non-biological substance can be accurately implemented in a short time. Therefore, the present invention can be advantageously used as a medical image diagnostic apparatus. For example imaging of optical property value distribution inside a living body and density distribution of a substrate constituting a biological tissue can be performed with the object of diagnostic of tumors or vascular diseases, follow-up of chemotherapy, and the like.

The acoustic wave acquiring apparatus and subject information acquiring apparatus are explained above, but the present invention can be also understood as a control method for controlling those apparatuses. In this case, the information processing device used by the apparatuses functions as a controller and a processor and causes the operation of the constituent elements of the apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-034469, filed on Feb. 25, 2013, which is hereby incorporated by reference herein in its entirety.

The invention claimed is:

1. An acoustic wave acquiring apparatus comprising:
   an array light source including a plurality of elements configured to emit measurement light;
   a controller configured to control a wavelength of the measurement light, which is emitted from the array light source, for each of the plurality of elements;
   a Fabry-Perot interferometer including a first mirror upon which the measurement light is incident and a second mirror upon which an acoustic wave from a subject is incident;
   an optical sensor configured to measure a light quantity of reflected light produced by reflection of the measurement light by the first and the second mirror; and
   a processor configured to acquire an intensity of the acoustic wave on the basis of a change of the light quantity of the reflected light that is caused by a change of a cavity length, which is a distance between the first mirror and the second mirror, occurring due to the incidence of the acoustic wave on the second mirror,
   wherein the controller controls the wavelength of the measurement light, which is emitted from the elements of the array light source, according to the cavity length so that a variation in sensitivity of detecting the acoustic wave is reduced for each position on the Fabry-Perot interferometer.

2. The acoustic wave acquiring apparatus according to claim 1, wherein the controller controls the wavelength of the measurement light, which is emitted from the elements of the array light source, according to a resonance wavelength of the measurement light based on the cavity length.

3. The acoustic wave acquiring apparatus according to claim 1, wherein the controller controls the wavelength of the measurement light, so that a sensitivity of detecting the acoustic wave is constant at each position on the Fabry-Perot interferometer.

4. The acoustic wave acquiring apparatus according to claim 1, wherein the array light source is a vertical-cavity surface-emitting laser array.

5. The acoustic wave acquiring apparatus according to claim 4, wherein the controller controls the wavelength of the measurement light, which is emitted from the elements of the array light source, by controlling an electric current supplied to the array light source.

6. The acoustic wave acquiring apparatus according to claim 4, wherein the controller controls the wavelength of the measurement light, which is emitted from the elements of the array light source, by controlling a temperature of the elements of the array light source.

7. The acoustic wave acquiring apparatus according to claim 1, wherein the processor normalizes the intensity of the acoustic wave by using a light quantity of the array light source.

8. The acoustic wave acquiring apparatus according to claim 1, further comprising:
   an excitation light source configured to emit excitation light to the subject,
   wherein the acoustic wave from the subject is generated by a photoacoustic effect produced by the excitation light.

9. The acoustic wave acquiring apparatus according to claim 8, further comprising:
   a beam optical system configured to change a beam diameter of the measurement light; and
   a beam controller configured to control the change in the beam diameter caused by the beam optical system.

10. The acoustic wave acquiring apparatus according to claim 9, wherein the beam controller controls the beam optical system so as to change the beam diameter when the measurement light is incident upon the first mirror and to return the beam diameter to the original diameter when a beam is reflected by the first and the second mirror and incident on the optical sensor.

11. The acoustic wave acquiring apparatus according to claim 1, further comprising a transducer configured to transmit an acoustic wave to the subject, wherein the acoustic wave from the subject is a reflected acoustic wave that is transmitted from the transducer.

12. The acoustic wave acquiring apparatus according to claim 1, wherein the processor generates image data on the subject interior on the basis of the intensity of the acoustic wave.

13. The acoustic wave acquiring apparatus according to claim 12, further comprising:
a display unit configured to display the image data.

14. The acoustic wave acquiring apparatus according to claim 12, wherein
the controller can perform control such that the elements of the array light source emit the measurement light while performing wavelength sweeping, and
the processor determines a wavelength when the measurement light is irradiated to generate the image data on the basis of a measurement result obtained with the optical sensor and relating to the measurement light emitted with wavelength sweeping being implemented.

15. An acoustic wave acquiring apparatus comprising:
an array light source including a plurality of elements configured to emit measurement light
a controller configured to control a wavelength of the measurement light, which is emitted from the array light source, for each of the plurality of elements;
a Fabry-Perot interferometer including a first mirror upon which the measurement light is incident and a second mirror upon which an acoustic wave from a subject is incident;
an optical sensor configured to measure a light quantity of reflected light produced by reflection of the measurement light by the first and the second mirror; and
a processor configured to acquire an intensity of the acoustic wave on the basis of a change of the light quantity of the reflected light that is caused by a change of a cavity length, which is a distance between the first mirror and the second mirror, occurring due to the incidence of the acoustic wave on the second mirror,
wherein the controller controls the wavelength of the measurement light, which is emitted from the elements of the array light source, so as to correct sensitivity variation due to variation in the cavity length between each position on the Fabry-Perot interferometer.

16. A control method for an acoustic wave acquiring apparatus including an array light source including a plurality of elements configured to emit measurement light, a controller configured to control a wavelength of the measurement light, which is emitted from the array light source, for each of or the plurality of elements, a Fabry-Perot interferometer including a first mirror upon which the measurement light is incident and a second mirror upon which an acoustic wave from a subject is incident, an optical sensor configured to measure a light quantity of reflected light produced by reflection of the measurement light by the first and the second mirror, and a processor configured to acquire an intensity of the acoustic wave on the basis of a change of the light quantity of the reflected light that is caused by a change of a cavity length, which is a distance between the first mirror and the second mirror, occurring due to the incidence of the acoustic wave on the second mirror, the control method comprising:
a step of operating the array light source to emit the measurement light under control by the control unit;
a step of operating the optical sensor to measure the reflected light from the Fabry-Perot interferometer;
a step of operating the processor to acquire the intensity of the acoustic wave; and
a step of controlling the wavelength of the measurement light, which is emitted from the elements of the array light source, according to the cavity length so that a variation in sensitivity of detecting the acoustic wave is reduced for each position on the Fabry-Perot interferometer.

17. The control method according to claim 16, wherein the step of controlling the wavelength of the measurement light includes controlling the wavelength of the measurement light so that sensitivity with which the acoustic wave is detected is constant at each position on the Fabry-Perot interferometer.

18. A control method for an acoustic wave acquiring apparatus including an array light source including a plurality of elements configured to emit measurement light, a controller configured to control a wavelength of the measurement light, which is emitted from the array light source, for each of or the plurality of elements, a Fabry-Perot interferometer including a first mirror upon which the measurement light is incident and a second mirror upon which an acoustic wave from a subject is incident, an optical sensor configured to measure a light quantity of reflected light produced by reflection of the measurement light by the first and the second mirror, and a processor configured to acquire an intensity of the acoustic wave on the basis of a change of the light quantity of the reflected light that is caused by a change of a cavity length, which is a distance between the first mirror and the second mirror, occurring due to the incidence of the acoustic wave on the second mirror, the control method comprising:
a step of operating the array light source to emit the measurement light under control by the control unit
a step of operating the optical sensor to measure the reflected light from the Fabry-Perot interferometer;
a step of operating the processor to acquire the intensity of the acoustic wave; wherein the step of controlling the wavelength of the measurement light includes controlling the wavelength of the measurement light so as to correct for sensitivity variation due to variation in the cavity length between each position on the Fabry-Perot interferometer.

* * * * *